United States Patent
Kamran et al.

(10) Patent No.: US 11,726,820 B2
(45) Date of Patent: Aug. 15, 2023

(54) PEEKING AND POLLING STORAGE MANAGEMENT SYSTEM AND METHOD

(71) Applicant: EMC IP Holding Company, LLC, Hopkinton, MA (US)

(72) Inventors: Lior Kamran, Rishon Lezion (IL); Amitai Alkalay, Kadima (IL)

(73) Assignee: EMC IP Holding Company, LLC, Hopkinton, MA (US)

(*) Notice: Subject to any disclaimer, the term of this patent is extended or adjusted under 35 U.S.C. 154(b) by 446 days.

(21) Appl. No.: 16/402,637

(22) Filed: May 3, 2019

(65) Prior Publication Data
US 2020/0348971 A1     Nov. 5, 2020

(51) Int. Cl.
G06F 9/46     (2006.01)
G06F 9/48     (2006.01)
G06F 13/20     (2006.01)

(52) U.S. Cl.
CPC ............ *G06F 9/4887* (2013.01); *G06F 13/20* (2013.01)

(58) Field of Classification Search
CPC .............................. G06F 9/4887; G06F 13/20
USPC ......................................................... 718/102
See application file for complete search history.

(56) References Cited

U.S. PATENT DOCUMENTS

| | | | | |
|---|---|---|---|---|
| 2002/0152305 A1* | 10/2002 | Jackson | ................ | H04L 41/509 709/224 |
| 2010/0162014 A1* | 6/2010 | Memon | ................ | G06F 9/4812 713/320 |
| 2011/0022817 A1* | 1/2011 | Gaster | ................... | G06F 9/5044 711/202 |
| 2011/0125990 A1* | 5/2011 | Khosravi | .............. | G06F 9/4416 713/2 |
| 2013/0024875 A1* | 1/2013 | Wang | ...................... | G06F 13/22 719/318 |
| 2018/0232540 A1* | 8/2018 | Matveev | ............... | G06F 9/4405 |

OTHER PUBLICATIONS

Edward Lamie, "Real-Time Embedded Multithreading Using ThreadX and MIPS", Apr. 24, 2019 (Year: 2019).*
Krazit, "Microsoft bets on a real-time operating system for IoT devices with Express Logic acquisition", Apr. 18, 2019 (Year: 2019).*
Blanchard, "From Express Logic ThreadX to Microsoft Azure RTOS", Oct. 14, 2020 (Year: 2020).*

* cited by examiner

*Primary Examiner* — Bradley A Teets
(74) *Attorney, Agent, or Firm* — Brian J. Colandreo; Heath M. Sargeant; Holland & Knight LLP

(57) ABSTRACT

A method, computer program product, and computing system for defining an affined OS-thread on each core of a multicore microprocessor, thus defining a plurality of affined OS-threads; executing a sequentially-activated polling thread on each of the affined OS-threads, wherein the sequentially-activated polling thread is configured to detect waiting IO activity on IO interfaces associated with the affined OS-threads; and if waiting IO activity is detected, activating one or more X-threads on a specific affined OS-thread that is associated with a specific IO interface on which the waiting IO activity was detected.

18 Claims, 3 Drawing Sheets

PEEKING AND POLLING STORAGE MANAGEMENT SYSTEM AND METHOD

TECHNICAL FIELD

This disclosure relates to storage management processes and, more particularly, to storage management processes that control polling.

BACKGROUND

Storing and safeguarding electronic content is of paramount importance in modern business. Accordingly, various methodologies may be employed to protect and distribute such electronic content, wherein the storage systems that process such content may strive to do so in as an efficient manner as possible. Unfortunately and due to inherent limitations in some of the technology utilized in such storage systems, complex methodologies may need to be utilized in order to navigate around such inherent shortcomings.

SUMMARY OF DISCLOSURE

In one implementation, a computer-implemented method is executed on a computing device and includes: defining an affined OS-thread on each core of a multicore microprocessor, thus defining a plurality of affined OS-threads; executing a sequentially-activated polling thread on each of the affined OS-threads, wherein the sequentially-activated polling thread is configured to detect waiting IO activity on IO interfaces associated with the affined OS-threads; and if waiting IO activity is detected, activating one or more X-threads on a specific affined OS-thread that is associated with a specific IO interface on which the waiting IO activity was detected.

One or more of the following features may be included. The waiting IO activity may be processed via the one or more X-threads on the specific affined OS-thread that is associated with the specific IO interface. Once the processing of the waiting IO activity is complete, the one or more X-threads may be deactivated on the specific affined OS-thread that is associated with the specific IO interface. Each of the affined OS-threads may execute a scheduler to enable the activation and deactivation of one or more X-threads associated with each of the affined OS-threads. Executing a sequentially-activated polling thread on each of the affined OS-threads may include executing a sequentially-activated polling thread on one of the plurality of affined OS-threads for a defined period of time before transferring execution of the sequentially-activated polling thread to another of the plurality of affined OS-threads. The defined period of time may be less than 100 microseconds. The IO interface may include one or more of: a front-end IO interface; an RPC Messaging IO interface; an RDMA Messaging IO interface; and a back-end IO interface.

In another implementation, a computer program product resides on a computer readable medium and has a plurality of instructions stored on it. When executed by a processor, the instructions cause the processor to perform operations including defining an affined OS-thread on each core of a multicore microprocessor, thus defining a plurality of affined OS-threads; executing a sequentially-activated polling thread on each of the affined OS-threads, wherein the sequentially-activated polling thread is configured to detect waiting IO activity on IO interfaces associated with the affined OS-threads; and if waiting IO activity is detected, activating one or more X-threads on a specific affined OS-thread that is associated with a specific IO interface on which the waiting IO activity was detected.

One or more of the following features may be included. The waiting IO activity may be processed via the one or more X-threads on the specific affined OS-thread that is associated with the specific IO interface. Once the processing of the waiting IO activity is complete, the one or more X-threads may be deactivated on the specific affined OS-thread that is associated with the specific IO interface. Each of the affined OS-threads may execute a scheduler to enable the activation and deactivation of one or more X-threads associated with each of the affined OS-threads. Executing a sequentially-activated polling thread on each of the affined OS-threads may include executing a sequentially-activated polling thread on one of the plurality of affined OS-threads for a defined period of time before transferring execution of the sequentially-activated polling thread to another of the plurality of affined OS-threads. The defined period of time may be less than 100 microseconds. The IO interface may include one or more of: a front-end IO interface; an RPC Messaging IO interface; an RDMA Messaging IO interface; and a back-end IO interface.

In another implementation, a computing system includes a processor and memory is configured to perform operations including defining an affined OS-thread on each core of a multicore microprocessor, thus defining a plurality of affined OS-threads; executing a sequentially-activated polling thread on each of the affined OS-threads, wherein the sequentially-activated polling thread is configured to detect waiting IO activity on IO interfaces associated with the affined OS-threads; and if waiting IO activity is detected, activating one or more X-threads on a specific affined OS-thread that is associated with a specific IO interface on which the waiting IO activity was detected.

One or more of the following features may be included. The waiting IO activity may be processed via the one or more X-threads on the specific affined OS-thread that is associated with the specific IO interface. Once the processing of the waiting IO activity is complete, the one or more X-threads may be deactivated on the specific affined OS-thread that is associated with the specific IO interface. Each of the affined OS-threads may execute a scheduler to enable the activation and deactivation of one or more X-threads associated with each of the affined OS-threads. Executing a sequentially-activated polling thread on each of the affined OS-threads may include executing a sequentially-activated polling thread on one of the plurality of affined OS-threads for a defined period of time before transferring execution of the sequentially-activated polling thread to another of the plurality of affined OS-threads. The defined period of time may be less than 100 microseconds. The IO interface may include one or more of: a front-end IO interface; an RPC Messaging IO interface; an RDMA Messaging IO interface; and a back-end IO interface.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
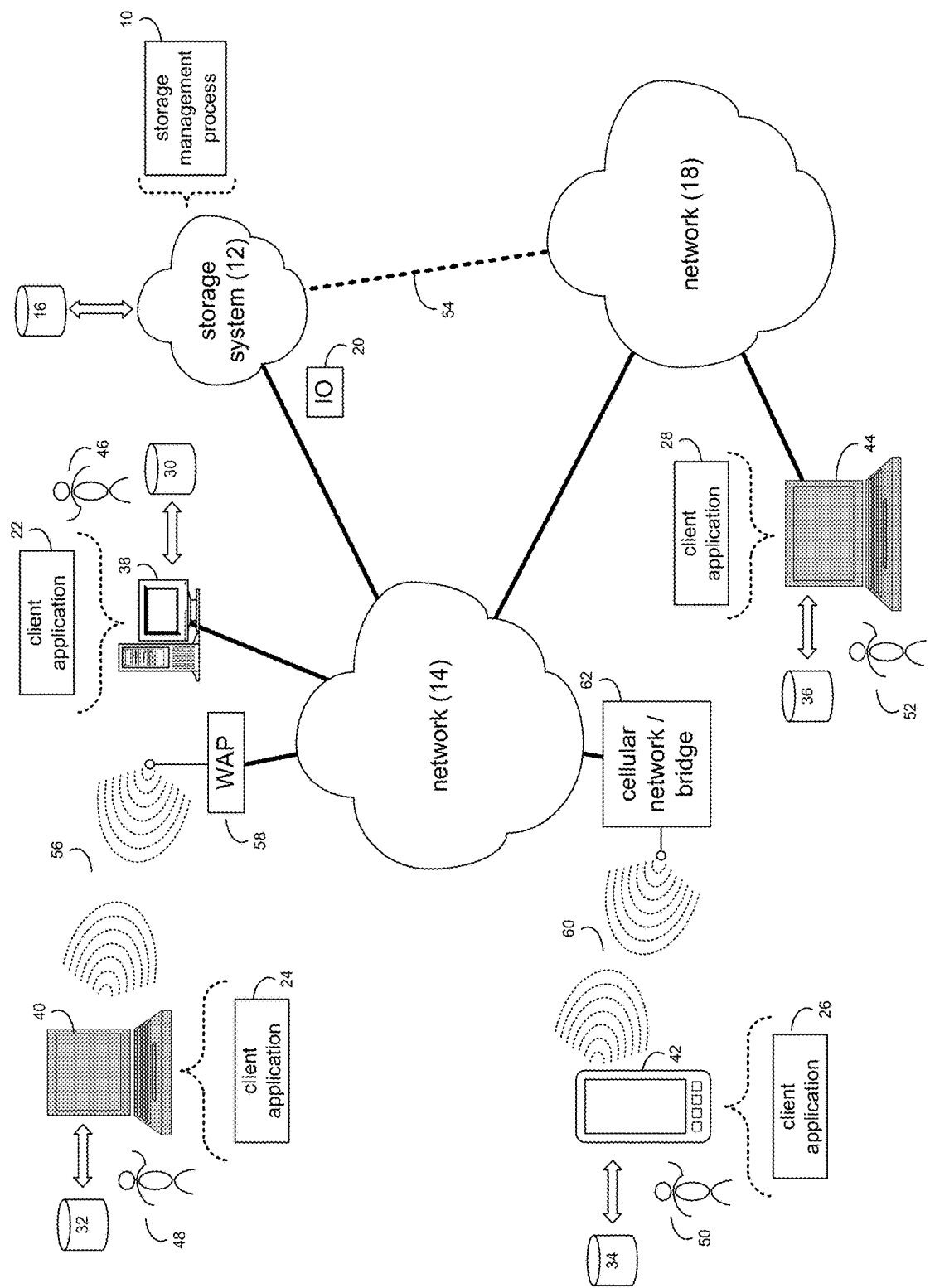
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random access memory (RAM); a read-only memory (ROM): and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
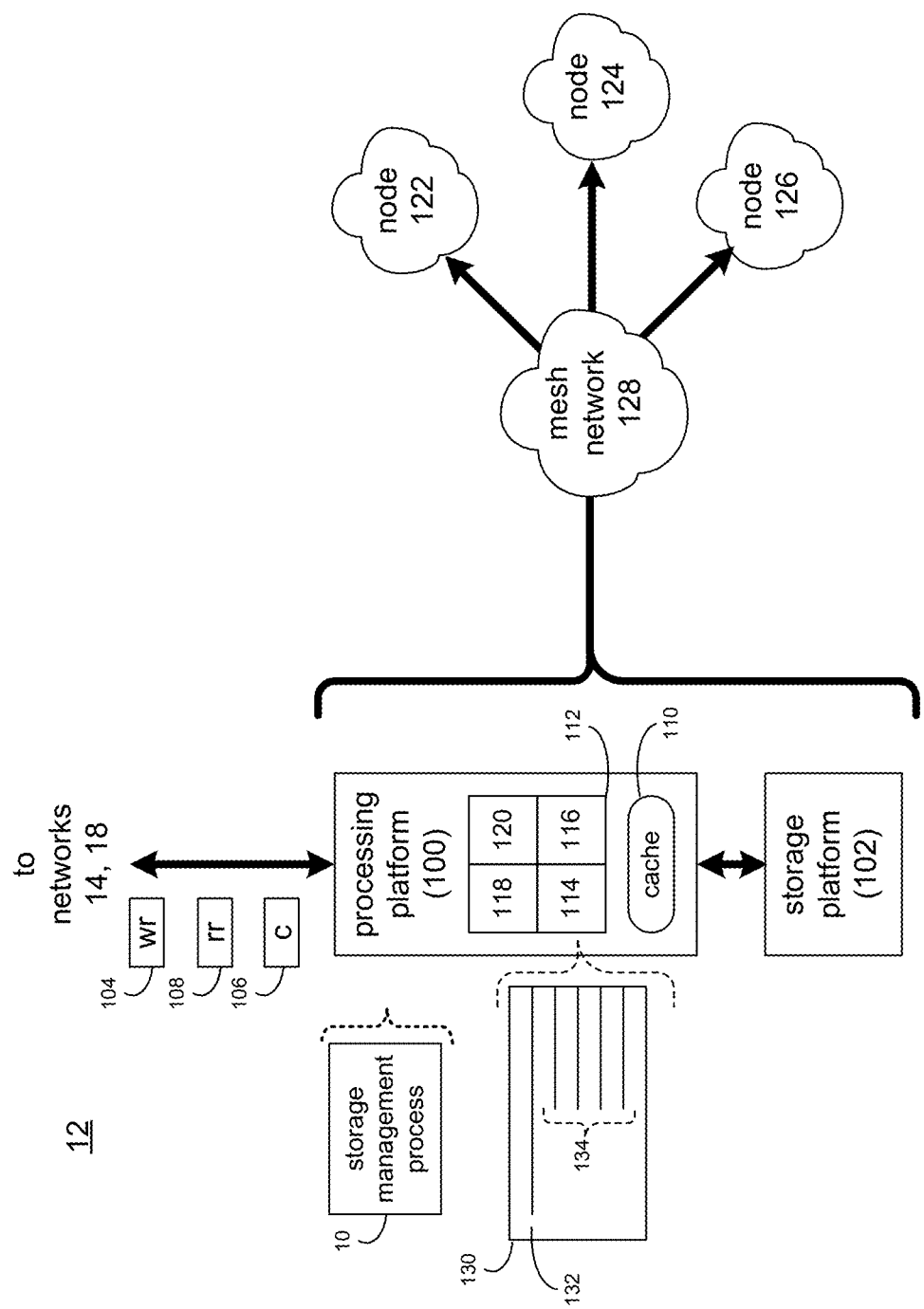
FIG. 2 is a diagrammatic view of the storage system of FIG. 1.

The Data Storage System:

Referring also to FIG. 2, there is shown a general implementation of storage system 12. In this general implementation, storage system 12 may include processing platform 100, wherein processing platform 100 may be configured to perform computational tasks and may be configured to store data within storage platform 102.

Depending on the manner in which storage system 12 is configured, storage platform 102 may include a single storage devices (such as a single hard disk drive or a single solid state storage device) or may include a plurality of storage devices that are configured to provide various levels of performance and/or high availability. For example and if storage platform 102 includes a plurality of storage devices (e.g., hard disk drives and/or solid state storage devices), this plurality of storage devices may be configured to form a RAID array utilizing various standard RAID structures (e.g., RAID 0, RAID 1, RAID 3, RAID 5, RAID 6, RAID 7 or RAID 10), thus providing a higher level of performance and/or availability.

Storage system 12 may be configured to execute all or a portion of storage management process 10. The instruction sets and subroutines of storage management process 10, which may be stored on a storage device (e.g., storage device 16) coupled to processing platform 100, may be executed by one or more processors (not shown) and one or more memory architectures (not shown) included within processing platform 100. Storage device 16 may include but is not limited to: a hard disk drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 104 (i.e. a request that content 106 be written to storage system 12) and data read request 108 (i.e. a request that content 106 be read from storage system 12).

During operation of processing platform 100, content 106 to be written to storage system 12 may be processed by processing platform 100. Additionally/alternatively and when storage system 12 is configured as an application server, content 106 to be written to storage system 12 may be internally generated by processing platform 100.

Processing platform 100 may include cache memory system 110. Examples of cache memory system 110 may include but are not limited to a volatile, solid-state, cache memory system (e.g., a dynamic RAM cache memory system) and/or a non-volatile, solid-state, cache memory system (e.g., a flash-based, cache memory system). Processing platform 100 may initially store content 106 within cache memory system 110. Depending upon the manner in which cache memory system 110 is configured, processing platform 100 may immediately write content 106 to storage platform 102 (if cache memory system 110 is configured as a write-through cache) or may subsequently write content 106 to storage platform 102 (if cache memory system 110 is configured as a write-back cache).

Storage system 12 may be configured to include one or more multicore microprocessors (e.g., multicore microprocessor 112), each of which may include a plurality of microprocessor cores (e.g., microprocessor cores 114, 116, 118, 120). An example of such a multicore microprocessor may include but is not limited to an Intel™ Xeon™ processor. And while multicore microprocessor 112 is shown to include four microprocessor cores, this is for illustrative purposes only and is not intended to be a limitation of this disclosure, as other configurations are possible and are considered to be within the scope of this disclosure. For example, multicore microprocessor 112 may include a larger number of microprocessor cores or a smaller number of microprocessor cores.

Storage system 12 may be configured to include a plurality of processing platforms and/or storage platforms (wherein a processing platform and a storage platform may collectively constitute a node). For example and in addition to processing platform 100/storage platform 102, storage system 12 may include (in this example) three additional nodes (e.g., nodes 122, 124, 126), each of which (as discussed above) may include a processing platform and a storage platform (not shown), wherein each of these nodes (e.g., nodes 122, 124, 126) may be coupled via a mesh network (e.g., mesh network 128).

Figure 3:
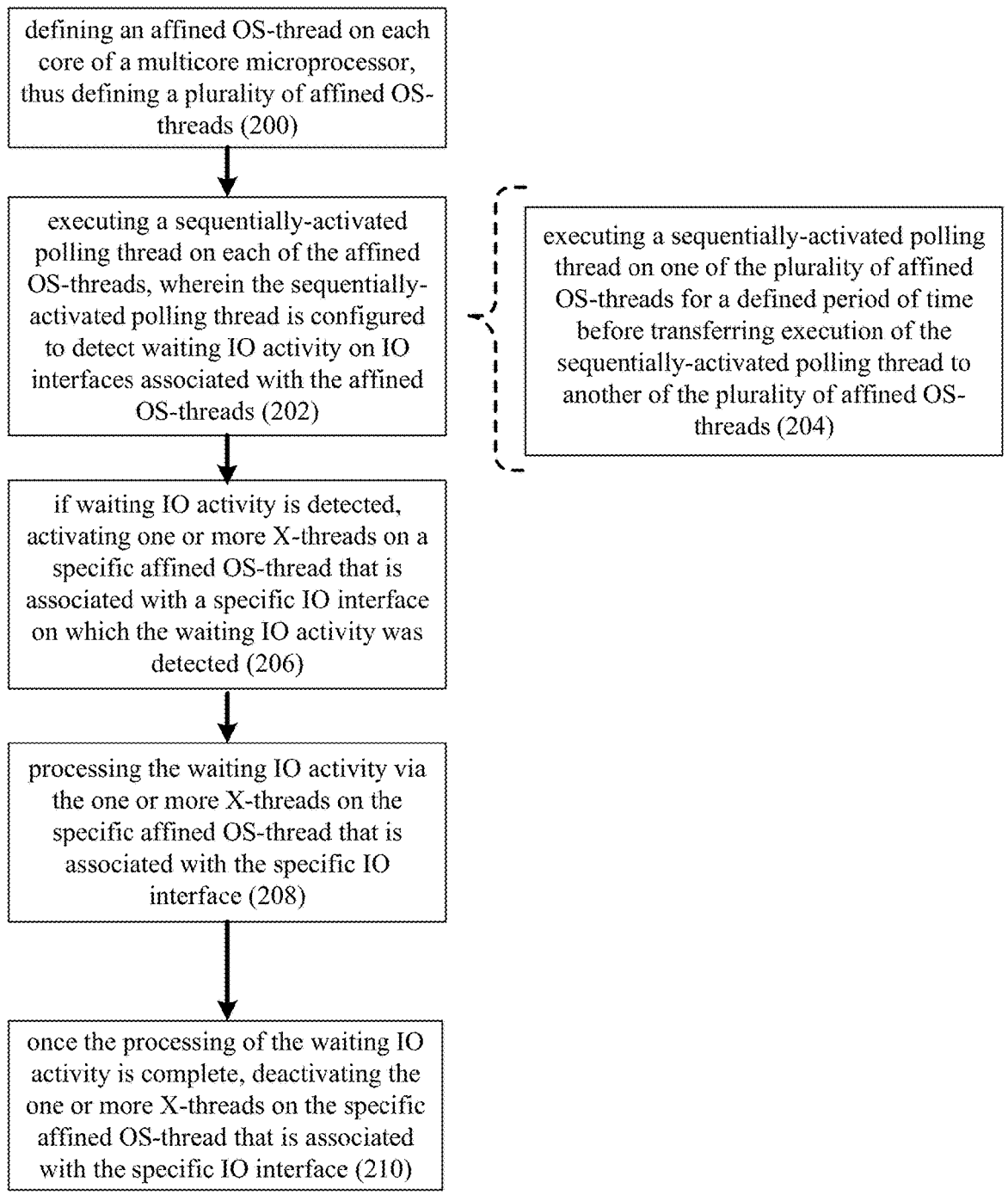
FIG. 3 is a flow chart of the storage management process of FIG. 1.

Referring also to FIG. 3, storage management process 10 may define 200 an affined OS-thread on each core (e.g., microprocessor cores 114, 116, 118, 120) of a multicore microprocessor (e.g., multicore processor 112), thus defining a plurality of affined OS-threads. Accordingly, each of microprocessor cores 114, 116, 118, 120 may execute an affined OS-thread, resulting in four affined OS-threads. Each of these affined OS-thread (which may be referred to as TRUCKs) may be configured to implement BLOCK functionality. For illustrative purposes and with respect to microprocessor core 114, microprocessor core 114 may execute affined OS-thread 130.

Storage management process 10 may execute 202 a sequentially-activated polling thread (e.g., sequentially-activated polling thread 132) on each of the affined OS-threads (e.g., affined OS-thread 130), wherein each of these sequentially-activated polling threads (e.g., sequentially-activated polling thread 132) may be configured to detect waiting IO activity on IO interfaces associated with the affined OS-threads (e.g., affined OS-thread 130). For example, sequentially-activated polling thread 132 may be associated with affined OS-thread 130, wherein sequentially-activated polling thread 132 may be configured to poll all of the IO interfaces associated with all of the affined OS-threads/microprocessor cores.

Specifically, each core (e.g., microprocessor cores 114, 116, 118, 120) of multicore processor 112 may be associated with a plurality of IO interfaces, examples of which may include but are not limited to:
 Front-End IO Interface: An interface for receiving (and replying to) IO requests from the user.
 RPC Messaging IO Interface: An interface for sending/receiving messages to/from other Nodes.
 RDMA Messaging IO Interface: An interface for RDMA transfer of buffers between Nodes.
 Back-End IO Interface: An interface for accessing the Disk Array e.g. Read/Write IOs to the disks.

When executing 202 a sequentially-activated polling thread (e.g., sequentially-activated polling thread 132) on each of the affined OS-threads (e.g., affined OS-thread 130), storage management process 10 may execute 204 a sequentially-activated polling thread (e.g., sequentially-activated polling thread 132) on one of the plurality of affined OS-threads (e.g., affined OS-thread 130) for a defined period of time before transferring execution of the sequentially-activated polling thread to another of the plurality of affined OS-threads. For example, this defined period of time may be less than 100 microseconds.

As discussed above, storage management process 10 may define 200 an affined OS-thread for each of microprocessor cores 114, 116, 118, 120 (of a multicore microprocessor 112), thus defining four affined OS-threads. Accordingly, storage management process 10 may execute 204 sequentially-activated polling thread 132 on affined OS-thread 130 for a defined period of time (e.g., 10 microseconds) during which sequentially-activated polling thread 132 may be configured to poll the IO interfaces associated with each of the four affined OS-threads (and, therefore, microprocessor cores 114, 116, 118, 120) to detect waiting IO activity on any of these IO interfaces. After expiry of this defined period of time, the IO interface polling responsibilities may be handed off to e.g., the sequentially-activated polling thread executed on the affined OS-thread associated with microprocessor core 116 . . . and then to the sequentially-activated polling thread executed on the affined OS-thread associated with microprocessor core 118 . . . and then to the sequentially-activated polling thread executed on the affined OS-thread associated with microprocessor core 120 . . . and then back to sequentially-activated polling thread 132 executed on affined OS-thread 130 associated with microprocessor core 114.

If waiting IO activity is detected on any of the IO interfaces associated with each of the four affined OS-threads, storage management process 10 may activate 206 one or more X-threads on the specific affined OS-thread that is associated with the specific IO interface on which the waiting IO activity was detected. An X-Thread may be a lightweight implementation of a thread that (in this example) is configured to interface with one or more of the above-described IO interface (e.g., an Front-End IO Interface, an RPC Messaging IO Interface, an RDMA Messaging IO Interface, an a Back-End IO Interface). Each of the affined OS-threads may be configured to execute a scheduler to enable the activation and deactivation of one or more X-threads associated with each of the affined OS-threads, thus enabling the unloading the related processor cores when the execution of such X-threads is unneeded.

For example, assume that sequentially-activated polling thread 132 on affined OS-thread 130 detects waiting IO activity on the Front-End IO Interface associated with microprocessor core 114. Storage management process 10 may activate 206 X-threads 134 on affined OS-thread 130 that are associated with Front-End IO Interface (i.e., the interface on which the waiting IO activity was detected). For example, assume that Front-End IO Interface is waiting to receive data from user 48.

Storage management process 10 may then process 208 the waiting IO activity (e.g., receiving data from user 48) via the one or more X-threads (e.g., X-threads 134) on the specific affined OS-thread (e.g., affined OS-thread 130) that is associated with the specific IO interface (e.g., the Front-End IO Interface associated with microprocessor core 114).

Once the processing of the waiting IO activity (e.g., receiving data from user 48) is complete, storage management process 10 may deactivate 210 the one or more X-threads (e.g., X-threads 134) on the specific affined OS-thread (e.g., affined OS-thread 130) that is associated with the specific IO interface (e.g., the Front-End IO Interface associated with microprocessor core 114), thus unloading (in this example) processor core 114.

Accordingly and through the use of the above-described system, the execution of a sequentially-activated polling thread (e.g., sequentially-activated polling thread 132) may be shared amongst all of the processor cores (e.g., microprocessor cores 114, 116, 118, 120 of multicore microprocessor 112) so that waiting IO activity on an IO interface may be detected. And upon (and only upon) detecting such waiting IO activity are the various X-threads associated with the appropriate affined OS-thread/processor core activated, thus saving the computational overhead associated with having these X-threads continuously activated.

For example, since storage management process 10 "peeks" the interfaces for all affined OS-threads (i.e., TRUCKs), the polling of these interfaces is accomplished via sequentially-activated polling thread 132. Specifically and as discussed above, this sequentially-activated polling thread 132 may run for a specific duration (e.g., 10 microseconds) and will then pass the polling responsibility to another sequentially-activated polling thread on a different affined OS-thread (i.e., a different TRUCK). Accordingly, all affined OS-threads (i.e., all TRUCKs) are implemented in exactly the same fashion and share the polling responsibilities. Further, the system remains balanced as the sequentially-activated polling thread hops between affined OS-threads (i.e., TRUCKs). This architecture allows BLOCK applications to utilize the cores of the microprocessor in correlation with user patterns (rather than constantly consuming 100% of the processing power), thus allowing other applications (e.g., FILE applications) to utilize the remaining CPU processor cycles. Accordingly, if the BLOCK application only consumes 20% of each affined OS-thread (i.e., each TRUCK), a FILE application may be able to utilize the remaining 80% of each CPU core.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    defining an affined OS-thread on each core of a multicore microprocessor, thus defining a plurality of affined OS-threads, wherein each of the affined OS-threads includes a sequentially-activated polling thread and one or more X-threads, wherein an X-thread is a lightweight implementation of an OS-thread;
    executing the sequentially-activated polling thread on each of the affined OS-threads, wherein the sequentially-activated polling thread is configured to detect waiting IO activity on IO interfaces associated with the affined OS-threads, wherein executing the sequentially-activated polling thread on each of the affined OS-threads includes executing the sequentially-activated polling thread on one of the plurality of affined OS-threads for a defined period of time before transferring execution of the sequentially-activated polling thread to another of the plurality of affined OS-threads, and wherein one or more block applications utilize the cores of the multicore microprocessor in correlation with user patterns consuming less than full utilization of the processing power of the multicore microprocessor, and one or more file applications utilize the remaining of each core of the multicore microprocessor;
    if waiting IO activity is detected, activating the one or more X-threads on a specific affined OS-thread that is associated with a specific IO interface on which the waiting IO activity was detected; and
    processing, on the affined OS-thread which executed the sequentially-activated polling thread that detected the waiting IO activity, the waiting IO activity via the one or more X-threads on the specific affined OS-thread that is associated with the specific IO interface.

2. The computer-implemented method of claim 1, further comprising:
    once the processing of the waiting TO activity is complete, deactivating the one or more X-threads on the specific affined OS-thread that is associated with the specific IO interface.

3. The computer-implemented method of claim 2, wherein each of the affined OS-threads executes a scheduler to enable the activation and deactivation of one or more X-threads associated with each of the affined OS-threads.

4. The computer-implemented method of claim 1, wherein the defined period of time is less than 100 microseconds.

5. The computer-implemented method of claim wherein the IO interface includes one or more of:
    a front-end IO interface;
    an RPC Messaging IO interface;
    an RDMA Messaging IO interface; and
    a back-end IO interface.

6. The computer-implemented method of claim 1, wherein the one or more X-threads are configured to interface with one or more of:
    a front-end IO interface;
    an RPC Messaging IO interface;
    an RDMA Messaging IO interface; and
    a back-end IO interface.

7. A computer program product residing on a non-transitory computer readable medium having a plurality of instructions stored thereon which, when executed by a processor, cause the processor to perform operations comprising:

defining an affined OS-thread on each core of a multicore microprocessor, thus defining a plurality of affined OS-threads, wherein each of the affined OS-threads includes a sequentially-activated polling thread and one or more X-threads, wherein an X-thread is a light-weight implementation of an OS-thread;

executing the sequentially-activated polling thread on each of the affined OS-threads, wherein the sequentially-activated polling thread is configured to detect waiting IO activity on IO interfaces associated with the affined OS-threads, wherein executing the sequentially-activated polling thread on each of the affined OS-threads includes executing the sequentially-activated polling thread on one of the plurality of affined OS-threads for a defined period of time before transferring execution of the sequentially-activated polling thread to another of the plurality of affined OS-threads, and wherein one or more block applications utilize the cores of the multicore microprocessor in correlation with user patterns consuming less than full utilization of the processing power of the multicore microprocessor, and one or more file applications utilize the remaining of each core of the multicore microprocessor;

if waiting IO activity is detected, activating the one or more X-threads on a specific affined OS-thread that is associated with a specific IO interface on which the waiting IO activity was detected; and processing, on the affined OS-thread which executed the sequentially-activated polling thread that detected the waiting IO activity, the waiting IO activity via the one or more X-threads on the specific affined OS-thread that is associated with the specific IO interface.

8. The computer program product of claim 7, further comprising:

once the processing of the waiting IO activity is complete, deactivating the one or more X-threads on the specific affined OS-thread that is associated with the specific IO interface.

9. The computer program product of claim 8, wherein each of the affined OS-threads executes a scheduler to enable the activation and deactivation of one or more X-threads associated with each of the affined OS-threads.

10. The computer program product of claim 7, wherein the defined period of time is less than 100 microseconds.

11. The computer program product of claim 7, wherein the IO interface includes one or more of:
a front-end IO interface;
an RPC Messaging IO interface;
an RDMA Messaging IO interface; and
a back-end IO interface.

12. The computer program product of claim 7, wherein the one or more X-threads are configured to interface with one or more of:
a front-end IO interface:
an RPC Messaging IO interface;
an RDMA Messaging IO interface; and
a back-end IO interface.

13. A computing system including a processor and memory configured to perform operations comprising:

defining an affined OS-thread on each core of a multicore microprocessor, thus defining a plurality of affined OS-threads, wherein each of the affined OS-threads includes a sequentially-activated polling thread and one or more X-threads, wherein an X-thread is a light-weight implementation of an OS-thread;

executing the sequentially-activated polling thread on each of the affined OS-threads, wherein the sequentially-activated polling thread is configured to detect waiting IO activity on IO interfaces associated with the affined OS-threads, wherein executing the sequentially-activated polling thread on each of the affined OS-threads includes executing the sequentially-activated polling thread on one of the plurality of affined OS-threads for a defined period of time before transferring execution of the sequentially-activated polling thread to another of the plurality of affined OS-threads, and wherein one or more block applications utilize the cores of the multicore microprocessor in correlation with user patterns consuming less than full utilization of the processing power of the multicore microprocessor, and one or more file applications utilize the remaining of each core of the multicore microprocessor;

if waiting IO activity is detected, activating the one or more X-threads on a specific affined OS-thread that is associated with a specific IO interface on which the waiting IO activity was detected; and processing, on the affined OS-thread which executed the sequentially-activated polling thread that detected the waiting IO activity, the waiting IO activity via the one or more X-threads on the specific affined OS-thread that is associated with the specific IO interface.

14. The computing system of claim 13, further comprising:

once the processing of the waiting IO activity is complete, deactivating the one or more X-threads on the specific affined OS-thread that is associated with the specific IO interface.

15. The computing system of claim 14, wherein each of the affined OS-threads executes a scheduler to enable the activation and deactivation of one or more X-threads associated with each of the affined OS-threads.

16. The computing system of claim 13, wherein the defined period of time is less than 100 microseconds.

17. The computing system of claim 13, wherein the IO interface includes one or more of:
a front-end IO interface;
an RPC Messaging IO interface;
an RDMA Messaging IO interface; and
a back-end IO interface.

18. The computing system of claim 13, wherein the one or more X-threads are configured to interface with one or more of:
a front-end IO interface;
an RPC Messaging IO interface;
an RDMA Messaging IO interface; and
a back-end IO interface.

* * * * *